United States Patent
Thomas et al.

(10) Patent No.: US 6,605,917 B2
(45) Date of Patent: Aug. 12, 2003

(54) METHOD AND A DEVICE FOR CONTROLLING AND REGULATING AN ALTERNATING CURRENT ROTATING ELECTRICAL MACHINE, IN PARTICULAR A SYNCHRONOUS ALTERNATING CURRENT ROTATING ELECTRICAL MACHINE

(75) Inventors: Jean-Luc Thomas, Thomery (FR); Jean-Claude Alacoque, Communay (FR); Serge Poullain, Arpajon (FR); Abdelkrim Benchaib, Montigny le Bretonneux (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 10/056,039

(22) Filed: Jan. 28, 2002

(65) Prior Publication Data

US 2002/0149337 A1 Oct. 17, 2002

(30) Foreign Application Priority Data

Feb. 14, 2001 (FR) .............................. 01 02012

(51) Int. Cl.$^7$ .............................. H02P 1/46; H02P 3/18; H02P 5/28; H02P 7/36
(52) U.S. Cl. ................... 318/700; 318/690; 318/715; 318/721; 318/254
(58) Field of Search ................. 318/690, 700, 318/701, 714–715, 720, 721, 722, 254

(56) References Cited

U.S. PATENT DOCUMENTS

| | | | | |
|---|---|---|---|---|
| 4,611,159 A | * | 9/1986 | Kurakake et al. | 318/803 |
| 4,629,958 A | * | 12/1986 | Kurakake et al. | 318/723 |
| 4,814,677 A | * | 3/1989 | Plunkett | 318/254 |
| 5,619,114 A | * | 4/1997 | Blasko | 318/812 |
| 5,852,355 A | * | 12/1998 | Turner | 318/701 |
| 6,366,048 B2 | * | 4/2002 | Greif | 318/701 |

FOREIGN PATENT DOCUMENTS

| | | |
|---|---|---|
| EP | 1 037 378 A | 9/2000 |
| EP | 1 045 541 A | 10/2000 |
| WO | WO 99 29031 A | 6/1999 |

OTHER PUBLICATIONS

Patent Abstracts of Japan, vol. 005, No. 007 (E–041), Jan. 17, 1981 & JP 55 1368900 A (Fuji Electric Co Ltd). Oct 25, 1980 *abstract.

* cited by examiner

*Primary Examiner*—Marlon T. Fletcher
(74) *Attorney, Agent, or Firm*—Sughrue Mion, PLLC

(57) ABSTRACT

A method of regulating a rotating electrical machine includes a preparatory step of determining a discrete voltage control law for the machine. The discrete control voltage to be applied at each sampling time is determined in the form of a first term corresponding to free evolution of the state of the machine in the absence of control, between the preceding sampling time and the current sampling time, and a second term dependent on the set point torque and a set point for the magnetic energy consumed by the machine. The method further includes, at each sampling time, a step of determining, with the aid of the discrete control law, the control voltage to be applied to the machine for the torque of the machine to reach the set point torque and the magnetic energy consumed by the machine to correspond to the set point magnetic energy.

10 Claims, 4 Drawing Sheets

METHOD AND A DEVICE FOR CONTROLLING AND REGULATING AN ALTERNATING CURRENT ROTATING ELECTRICAL MACHINE, IN PARTICULAR A SYNCHRONOUS ALTERNATING CURRENT ROTATING ELECTRICAL MACHINE

BACKGROUND OF THE INVENTION

1. Field of the Invention

The present invention relates to a method of regulating an alternating current rotating electrical machine, in particular a synchronous electric motor with smooth poles. It also relates to a device for supplying power to an alternating current rotating electrical machine.

It applies in particular, although not exclusively, to motors used in rail transportation for traction and active suspension.

To be more precise, the invention relates to a regulation method capable of slaving the electromagnetic torque of the machine to a set point torque.

2. Description of the Prior Art

The speed of a synchronous machine is generally controlled by regulating its electromagnetic torque. To this end, rotating machines are generally provided with a regulator receiving as input a set point electromagnetic torque and one or more sampled signals representing the electromagnetic torque of the machine and produced by measuring the stator current, the regulator applying a control voltage to a power supply inverter of the machine. To slave the electromagnetic torque of the machine to the set point torque, at each sampling time the regulator predicts the torque at the next sampling time and modifies the inverter control voltage accordingly.

A principal concern in most industrial applications is improving the dynamic performance of such machines and in particular increasing the torque dynamic range.

A first solution is to increase the switching capacity of the power switches of the inverter in order to increase the switching frequency. However, this solution implies using very costly power components and increases switching losses.

The system could use low-loss electronic components. This is unacceptable, however, because it considerably increases the cost of the power supply device of the machine.

There exist methods of defining the operation of a regulator using a continuous time model to model the operation of the machine, to carry out what is referred to as a "synthesis" by using the model to determine, again in continuous time, equations yielding the corrective control input to the system as a function of operating parameters required to obtain the specified operation, and then to convert the equations into a discrete time form to obtain differential equations that can be solved by a digital computer integrated into the regulator.

However, the performance of such methods is limited in terms of control dynamic range, and instability can occur if the sampling period imposed by the inverter is too long. Also, these methods cannot produce a set point torque within a single sampling period.

Patent application EP 1 045 514 discloses a method of controlling a rotating electrical machine using a discrete model of the machine and the power supply inverter of the machine, the model providing the control voltage to be applied to the machine by the inverter to achieve a set point torque and a set point magnetic flux modulus. However, the model is suitable for asynchronous rotating machines, and cannot be applied to any rotating machine regardless of its type. Furthermore, regulating the torque and the flux modulus does not take into consideration all the operating parameters of the machine. As a result of all this, the dynamic performance of the machine still has room for improvement.

SUMMARY OF THE INVENTION

An object of the invention is to overcome the drawbacks previously cited. That objective is achieved by providing a method of regulating a rotating electrical machine receiving as input a discrete control voltage determined to slave the electromagnetic torque delivered by the machine to a set point torque, said method consisting of determining at each sampling time k−1 the discrete control voltage to be applied to the machine as a function of at least one sampled signal representing the electromagnetic torque of the machine, so that the set point torque is reached at the next sampling time k, which method includes:

a preparatory step of determining a discrete voltage control law of the machine, in which the discrete control voltage to be applied at each sampling time k is determined in the form of a first term corresponding to free evolution of the state of the machine in the absence of control, between the preceding sampling time k−1 and the current sampling time, and a second term dependent on the set point torque and a set point for the magnetic energy consumed by the machine, and at each sampling time, a step of determining, with the aid of the discrete control law, the control voltage to be applied to the machine for the torque of the machine to reach the set point torque and the magnetic energy consumed by the machine to correspond to the set point magnetic energy.

The set point energy is advantageously a minimum energy.

According to one feature of the invention the discrete control law determined during the preparatory step is of the form:

$$\vec{V}_{s,k-1} = \vec{f}(\Delta\Gamma_k, \Delta W_k)$$

in which f is a function giving the control voltage to be applied at sampling time k−1 to reach the set point torque and energy as a function of variables $\Delta\Gamma_k$ and $\Delta W_k$ respectively representing the difference between the electromagnetic torque of the machine to be reached at the next sampling time k and the free evolution component of said torque at said time and the difference between the magnetic energy consumed by the machine at time k and the free evolution component of said energy at said time.

According to another feature of the invention the discrete control law is determined in a system of axes $(\tilde{d}, \tilde{q})$ fixed with respect to the free evolution in discrete time of the rotor flux of the machine.

If the machine is a synchronous machine with smooth poles the discrete control law determined during the preparatory step is of the following form:

$$\begin{bmatrix} v_{\tilde{d}} \\ v_{\tilde{q}} \end{bmatrix}_{k-1} = \frac{1}{a\|\tilde{\Phi}_k^0\|} \begin{bmatrix} \Delta W \\ \Delta\Gamma \end{bmatrix}_k$$

in which $V_{\tilde{d},k-1}$ and $V_{\tilde{q},k-1}$ represent the components of the control voltage vector at time k−1, expressed in a system of axes ($\tilde{d}, \tilde{q}$) that is mobile in discrete time and fixed with respect to the free evolution $\vec{\Phi}_k^0$ of the rotor flux in the machine at the next sampling time k, $\|\vec{\Phi}_k^0\|$ corresponds to the modulus of the free evolution of the rotor flux at the next time sampling k, $\Delta\Gamma_k$ and $\Delta W_k$ respectively representing the difference between the electromagnetic torque of the machine to be reached at the next sampling time k and the component of free evolution of said torque at said time and the difference between the magnetic energy consumed by the machine at the sampling time k and the component of free evolution of said energy at said time.

The machine is advantageously a synchronous machine with surface-mounted permanent magnets.

Alternatively the machine is a synchronous machine with wound smooth poles.

According to one feature of the invention, when the machine is rotating at a speed less than a predefined threshold, the method includes implementing a low-speed strategy consisting of determining the control voltage to be applied to the machine to reach the set point torque at the next sampling time with zero magnetic energy input.

The low-speed strategy preferably consists of applying the following discrete control law:

$$\begin{bmatrix} v_{\tilde{d}} \\ v_{\tilde{q}} \end{bmatrix}_{k-1} = \begin{bmatrix} \dfrac{-I_{k,\tilde{d}}^0}{a} \\ \dfrac{\Delta\Gamma_k}{a\|\vec{\Phi}_k^0\|} \end{bmatrix}$$

in which $I_{k,\tilde{d}}^0$ is the component of the free evolution of the stator current along the axis $\tilde{d}$ of the system of axes fixed with respect to the free evolution of the rotor flux during the sampling period between the sampling times k−1 and k.

According to another feature of the invention, when the machine is rotating at a speed greater than a predefined threshold, the method includes using a high-speed strategy consisting of taking account of limitations of the inverter to determine an intermediate set point torque that the machine can reach at the next sampling time with a given consumption of magnetic energy.

The high-speed strategy preferably includes solving the following system of equations:

$$(I_{k,\tilde{d}} - I_{k,\tilde{d}}^0)^2 + (I_{k,\tilde{q}} - I_{k,\tilde{q}}^0)^2 = (a\|\vec{V}_{smax}\|)^2$$

$$I_{k,\tilde{d}}^2 + I_{k,\tilde{q}}^2 = \|\vec{I}_{smax}\|^2$$

in which $I_{k,\tilde{d}}$ and $I_{k,\tilde{q}}$ are the components of the stator current in the system of axes ($\tilde{d},\tilde{q}$) at the time k, $I_{k,\tilde{d}}^0$ and $I_{k,\tilde{q}}^0$ are the components of the free evolution of the stator current in said system of axes at the same time, $\|\vec{V}_{smax}\|$ and $\|\vec{I}_{smax}\|$ are respectively the moduli of the maximum voltage and the maximum current in the stator, and "a" is a constant, the control voltage being obtained with the aid of the following equation $$\begin{bmatrix} v_{\tilde{d}} \\ v_{\tilde{q}} \end{bmatrix}_{k-1} = \begin{bmatrix} \dfrac{I_{k,\tilde{d}} - I_{k,\tilde{d}}^0}{a} \\ \dfrac{I_{k,\tilde{q}} - I_{k,\tilde{q}}^0}{a} \end{bmatrix}.$$

The invention also provides a regulator for a rotating machine, including an inverter fed with a power supply voltage, a regulator receiving as input a set point electromagnetic torque and at least one sampled signal representing the electromagnetic torque of the machine and supplying to the inverter a control signal adapted to slave the electromagnetic torque of the machine to the set point torque by predicting, at each sampling time, the electromagnetic torque at the next sampling time and consecutively modifying the control voltage, which regulator includes:

a discrete control law for the machine, stored in memory, said control law giving the discrete control voltage to be applied to the machine at a current sampling time k in the form of a first term corresponding to the free evolution of the state of the machine in the absence of control between the preceding sampling time k−1 and the current sampling time k and a second term dependent on the set point torque and a set point for the magnetic energy consumed by the machine, and means for determining at each sampling time, with the aid of the discrete control law, the control voltage to be applied to the machine so that the electromagnetic torque of the machine reaches the set point torque and the magnetic energy consumed by the machine corresponds to the set point energy.

A preferred embodiment of the invention is described hereinafter by way of non-limiting example and with reference to the accompanying drawings.

DETAILED DESCRIPTION OF THE PREFERRED EMBODIMENTS

Figure 1:
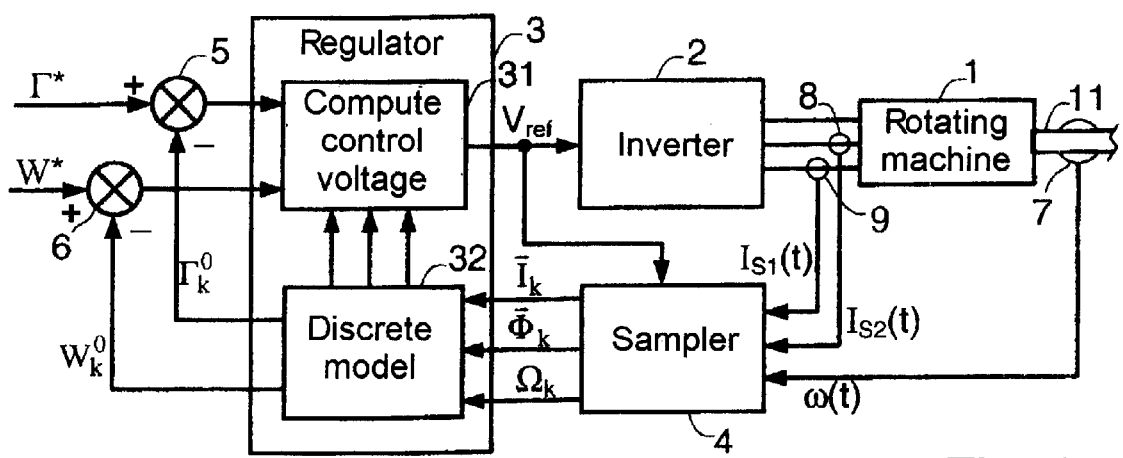
FIG. 1 is a block diagram of a power supply device of a rotating machine conforming to the invention.

FIG. 1 shows a rotating machine 1 consisting of a three-phase synchronous electric motor, for example, used to drive an electrical rail vehicle, a robot or a machine tool. The rotating machine 1 is supplied with power by a power supply device 2 which includes, in the conventional way, a voltage inverter supplying power to the motor 1 by way of a three-phase alternating current voltage; the inverter is connected to a direct current voltage power supply, with a supply voltage of the order of 1 500 V to 3 000 V in the case of a rail traction application, for example.

The inverter 2 is controlled by a regulator 3 which is designed to deliver a control voltage $V_{ref}$ which determines the voltage to be applied to the machine 1 by the inverter 2, this voltage being produced by the regulator 3 in order to slave the electromagnetic torque of the machine 1 to a set point electromagnetic torque $\Gamma^*$.

As can be seen in FIG. 1, the regulator 3 also receives as input one or more sampled signals, preferably the signals $\vec{I}_k, \vec{\Phi}_k, \vec{\Omega}_k$ respectively corresponding to discrete values of the stator current vector, the magnetic flux vector and the rotation speed of the rotor of the machine 1; these signals, representing the electromagnetic torque of the machine, are produced by a sampler observer 4 from continuous signals $I_{S1}(t)$, $I_{S2}(t)$ and $\omega(t)$ measured at the motor input and output and respectively corresponding to two phases of the stator current and a rotor rotation mechanical speed measurement signal delivered by appropriate sensors with which the machine 1 is equipped. The two measured phases of the stator current are used to deduce the third phase, assuming that the machine is balanced. The three phases are then used to determine the components $I_\alpha$, $I_\beta$) of a stator current vector expressed in a two-dimensional system of axes fixed with respect to the stator of the machine 1.

In the conventional way, to slave the electromagnetic torque of the machine 1 to the set point torque $\Gamma^*$ received as input, the regulator 3 uses software stored in memory to predict at each sampling time the electromagnetic torque at the next sampling time, and modifies accordingly the control voltage $V_{ref}$ to be synthesized by the inverter 2, and which is applied to the machine, to obtain the torques imposed by the set points.

The regulator 3 is preferably a "stack response" regulator, i.e. it modifies the control voltage $V_{ref}$ to produce the set points at the next sampling time.

To this end, the regulator 3 includes a first stage 32, which stores in memory a discrete model of the rotating machine 1, enabling the change in the state of the machine between two sampling times to be computed, and a second stage 31, which computes the control voltage $V_{ref}$ as a function of the change in the state of the machine predicted by the first stage 32 and the set point signal $\Gamma^*$ at the input of the second stage 31.

The remainder of the description first describes the method of computing the discrete model of the rotating machine 1 and then the method of computing the control voltage $V_{ref}$.

As previously mentioned, the dynamic behavior of the rotating machine 1 is modeled by a continuous time differential algebraic system.

The machine can be modeled by the following equations:

$$\dot{\vec{X}} = A(\Omega)\vec{X} + B\vec{V}_S \quad (1)$$

$$\vec{Y} = h(\vec{X}) \quad (2)$$

in which:

$\vec{X}$ is a state vector modeling the operation of the machine 1, and is defined by the equation $$\dot{\vec{X}} = \frac{d\vec{X}}{dt},$$

$\vec{V}_S$ represents the vector of the voltage applied to the input of the machine, which is equal to the stator voltage of the machine, $A(\Omega)$ is a state matrix dependent on the mechanical speed $\Omega$, B is an input matrix of the voltage vector, $\vec{Y}$ is an output vector including the electromagnetic torque $\Gamma$, and h is a non-linear function.

The above equation assumes that the relation between the control voltage $V_{ref}$ and the stator voltage $\vec{V}_S$ is known, depending entirely on the characteristics of the inverter.

In the case of a synchronous motor, the state vector $\vec{X}$ can be defined by the components of the stator current and by the components of the rotor flux, as follows:

$$\vec{X} = \begin{bmatrix} \vec{I}_s \\ \vec{\Phi} \end{bmatrix} \begin{bmatrix} I_{s\alpha} \\ I_{s\beta} \\ \Phi_\alpha \\ \Phi_\beta \end{bmatrix} \quad (3)$$

where the components of the stator current and the rotor flux are expressed in a system of axes ($\alpha$, $\beta$) fixed with respect to the stator of the machine 1, for example.

According to the invention, the output vector $\vec{Y}$ defined by equation (2) has the electromagnetic torque of the motor and the magnetic energy as components. It is written as follows:

$$\vec{Y} = \begin{bmatrix} y_1 \\ y_2 \end{bmatrix} = \begin{bmatrix} W \\ \Gamma \end{bmatrix} = \begin{bmatrix} \vec{\Phi} \cdot \vec{I}_s \\ n_p \vec{\Phi} \times \vec{I}_s \end{bmatrix} \quad (4)$$

in which the operator "x" represents the vector product and the operator "·" represents the scalar product.

It will be noted that in the foregoing description the stator voltage $\vec{V}_S$ can be considered to be constant between two successive sampling periods.

The state equation (1) can be converted into a discrete form as follows:

$$\vec{X}_k = F(\Omega_{k-1})\vec{X}_{k-1} + G(\Omega_{k-1})\vec{V}_{s,k-1} \quad (5)$$

with $F(\Omega) = e^{A(\Omega)\delta}$ and $G(\Omega) = A^{-1}(\Omega)[e^{A(\Omega)\delta} - 1]B$, $\vec{X}_k$, $\vec{V}_{S,k}$ and $\Omega_k$ respectively representing the discrete values of the state vector $\vec{X}$, the stator voltage $\vec{V}_S$ and the mechanical speed $\Omega_k$ of the motor at sampling time k, and $\delta$ representing the sampling period. It is assumed in the following description that the mechanical speed $\Omega_k$ of the motor is constant during each sampling period.

The matrices F and G can be represented in the following manner:

$$F = \begin{bmatrix} F_1 & F_2 \\ F_3 & F_4 \end{bmatrix} \text{ and } G = \begin{bmatrix} G_1 \\ G_2 \end{bmatrix} \quad (6)$$

Equation (5) is therefore written in the following manner:

$$\vec{X}_k = \begin{bmatrix} \vec{I} \\ \vec{\Phi} \end{bmatrix}_k = \begin{bmatrix} F_1 & F_2 \\ F_3 & F_4 \end{bmatrix} \begin{bmatrix} \vec{I} \\ \vec{\Phi} \end{bmatrix}_{k-1} + \begin{bmatrix} G_1 \\ G_2 \end{bmatrix} \begin{bmatrix} v_\alpha \\ v_\beta \end{bmatrix}_{k-1} \quad (7)$$

The state vector $\vec{X}_k$ can therefore be divided into a portion which evolves freely, i.e. in the absence of any voltage control, and a portion due to the control voltage $\vec{V}_{S,k}$ applied to the machine:

$$\vec{X}_k = \vec{X}_k^0 + G\vec{V}_{s,k-1} \quad (8)$$

or:

$$\begin{bmatrix} \vec{I} \\ \vec{\Phi} \end{bmatrix}_k = \begin{bmatrix} \vec{I}^0 \\ \vec{\Phi}^0 \end{bmatrix}_k + G\begin{bmatrix} v_\alpha \\ v_\beta \end{bmatrix}_{k-1} \quad (9)$$

Consequently, the free evolution of the stator current and the rotor flux $\vec{I}_k^0$ and $\vec{\Phi}_k^0$ are written in the following manner:

$$\vec{I}_k^0 = [F_1 \; F_2]\begin{bmatrix} \vec{I} \\ \vec{\Phi} \end{bmatrix}_{k-1} \text{ and}$$

$$\vec{\Phi}_k^0 = [F_3 \; F_4]\begin{bmatrix} \vec{I} \\ \vec{\Phi} \end{bmatrix}_{k-1} \quad (10)$$

The method according to the invention then uses the above equations to determine a function f yielding the control voltage $V_{ref}$ or the stator voltage to be applied at each sampling time k as a function of variables $\Delta\Gamma_k$ and $\Delta W_k$ respectively representing the difference between the electromagnetic torque of the machine to be obtained at the sampling time k and the freely evolving component of that torque at that time and the difference between the magnetic energy of the machine at the time k and the freely evolving component of that energy at that time.

A function of the above kind can be expressed in the following manner:

$$\vec{V}_{s,k-1} = f(\Delta\Gamma_k, \Delta W_k) \quad (11)$$

In the case of a synchronous motor with smooth poles, for example with permanent magnets mounted on the surface of the rotor, or whose poles are provided by a winding at the surface of the rotor, the matrices $A(\Omega)$, B and the vector $\vec{V}_s$ take the following form in the system of axes $(\alpha, \beta)$:

$$A(\Omega) = \begin{bmatrix} -\frac{R_s}{L_s} & 0 & 0 & n_p\frac{\Omega}{L_s} \\ 0 & -\frac{R_s}{L_s} & -n_p\frac{\Omega}{L_s} & 0 \\ 0 & 0 & 0 & -n_p\Omega \\ 0 & 0 & n_p\Omega & 0 \end{bmatrix}, B = \begin{bmatrix} \frac{1}{L_s} & 0 \\ 0 & \frac{1}{L_s} \\ 0 & 0 \\ 0 & 0 \end{bmatrix}, \vec{V}_s = \begin{bmatrix} v_\alpha \\ v_\beta \end{bmatrix}$$

in which $R_s$ is the resistance of the stator of the motor 1, $L_s$ is the inductance of the stator, and $n_p$ is the number of pairs of poles of the motor.

As a result of this, the matrices $F_i$ and $G_j$ introduced into equation (6) have the following values:

$$F_1 = \begin{bmatrix} e^{-\frac{\delta}{\tau_s}} & 0 \\ 0 & e^{-\frac{\delta}{\tau_s}} \end{bmatrix}, F_3 = \begin{bmatrix} 0 & 0 \\ 0 & 0 \end{bmatrix}, F_4 = \begin{bmatrix} \cos\theta & -\sin\theta \\ \sin\theta & \cos\theta \end{bmatrix},$$

$$F_2 = \frac{Z_1}{L_s Z_2^2}\begin{bmatrix} -Z_1\cos\theta + R_s\sin\theta + Z_1 e^{-\frac{\delta}{\tau_s}} & Z_1\sin\theta + R_s\cos\theta - R_s e^{-\frac{\delta}{\tau_s}} \\ -Z_1\sin\theta - R_s\cos\theta + R_s e^{-\frac{\delta}{\tau_s}} & -Z_1\cos\theta + R_s\sin\theta + Z_1 e^{-\frac{\delta}{\tau_s}} \end{bmatrix}$$

$$G_1 = \begin{bmatrix} a & 0 \\ 0 & a \end{bmatrix}, G_2 = \begin{bmatrix} 0 & 0 \\ 0 & 0 \end{bmatrix},$$

in which $Z_1 = L_s n_p \Omega$, $Z_2^2 = R_s^2 + Z_1^2$, $\tau_s = \frac{L_s}{R_s}$, $\theta = \delta n_p \Omega$ and $$a = \frac{1}{R_s}\left(1 - e^{-\frac{\delta}{\tau_s}}\right).$$

Note that the above expressions do not involve the position of the rotor.

What is more, for the above type of motor, equation (5) is written in the following manner:

$$\vec{X}_k = \begin{bmatrix} \vec{I} \\ \vec{\Phi} \end{bmatrix}_k = \begin{bmatrix} F_1 & F_2 \\ F_3 & F_4 \end{bmatrix}\begin{bmatrix} \vec{I} \\ \vec{\Phi} \end{bmatrix}_{k-1} + a\begin{bmatrix} v_\alpha \\ v_\beta \end{bmatrix}_{k-1} = \begin{bmatrix} \vec{I}^0 \\ \vec{\Phi}^0 \end{bmatrix}_{k-1} + a\begin{bmatrix} v_\alpha \\ v_\beta \end{bmatrix}_{k-1} \quad (13)$$

Consequently, the free evolution of the stator current and the rotor flux $\vec{I}_k^0$ and $\vec{\Omega}_k^0$ are written in the following manner:

$$\vec{I}_k^0 = [F_1 \; F_2]\begin{bmatrix} \vec{I} \\ \vec{\Phi} \end{bmatrix}_{k-1} \text{ and}$$

$$\vec{\Phi}_k^0 = \vec{\Phi}_k = [F_3 \; F_4]\begin{bmatrix} \vec{I} \\ \vec{\Phi} \end{bmatrix}_{k-1} = F_4 \vec{\Phi}_{k-1} \quad (14)$$

Furthermore, from equation (4), the electromagnetic torque is defined by the following equation:

$$\Gamma_k = n_p \vec{\Phi}_k \times \vec{I}_k \quad (15)$$

If the stator current and the rotor flux obtained from equation (13) are substituted in the above expression for the torque, a formula is obtained in which the torque is also divided into a freely evolving part and a part due to the control voltage:

(12)

$$\Gamma_k = \Gamma_k^0 + a n_p \vec{\Phi}_k^0 \times \vec{V}_{s,k-1} \quad (16)$$

the freely evolving part of the torque being equal to:

$$\Gamma_k^0 = n_p \vec{\Phi}_k^0 \times \vec{I}_k^0 \quad (17)$$

Consider now the quantity:

$$\Delta\Gamma_k = \frac{\Gamma_k - \Gamma_k^0}{n_p} \quad (18)$$

$$\frac{\Delta \Gamma_k}{a} = \vec{\Phi}_k^0 \times \vec{V}_{ref,k-1} = \Phi_{k,\alpha}^0 v_{\beta,k-1} - \Phi_{k,\beta}^0 v_{\alpha,k-1} \quad (19)$$

Now, from equation (14), $$\vec{\Phi}_k^0 = \vec{\Phi}_k = F_4 \vec{\Phi}_{k-1} = \begin{bmatrix} \cos\theta & -\sin\theta \\ \sin\theta & \cos\theta \end{bmatrix} \vec{\Phi}_{k-1} \quad (20)$$

Consequently, in the case of a synchronous motor with surface-mounted permanent magnets, the rotor flux has a constant modulus that is equal to the modulus of the magnetic flux $\|\vec{\Omega}_m\|$ and in each sampling period rotates through an angle $\theta = \delta n_p \Omega$. Regulation is therefore not possible on the basis of a set point magnetic flux modulus, as explained in patent application EP 1 045 514.

As the stator voltage does not interfere with the evolution of the rotor flux, it is possible to consider only the torque equation in which the two components of the stator voltage $\vec{V}_s$ in the system of axes ($\alpha$, $\beta$) appear, which leaves one degree of freedom (an equation in two unknowns). As a result of this, it is possible additionally to control another operating parameter of the motor to maximize the torque for a given stator current, taking account of voltage and current limitations in the stator. Furthermore, as previously mentioned, the object of the present invention is to provide "stack response" torque control (so that $\Gamma^* = \Gamma_k$) and to control the magnetic energy in the machine, which amounts to the same thing as also controlling the projection of the stator current onto the rotor flux. From equation (4), the magnetic energy in the machine takes the form:

$$W_k = \vec{\Phi}_k \cdot \vec{I}_k = \vec{\Phi}_k^0 \cdot \vec{I}_k \quad (21)$$

From equation (13), the stator current is given by the following equation:

$$\vec{I}_k = \vec{I}_k^0 + a\vec{V}_{s,k-1} \quad (22)$$

As a result of this:

$$\frac{\Delta W_k}{a} = \frac{W_k - W_k^0}{a} = \frac{\vec{\Phi}_k^0 (\vec{I}_k - \vec{I}_k^0)}{a} = \vec{\Phi}_k^0 \vec{V}_{s,k-1} = \Phi_{k,\alpha}^0 v_{\alpha,k-1} + \Phi_{k,\beta}^0 v_{\beta,k-1} \quad (23)$$

The control law for the voltage $V_S$ can then be deduced from equations (19) and (23):

$$\begin{cases} v_{\alpha,k-1} = \dfrac{\Phi_{k,\alpha}^0 (\Phi_{k,\alpha}^0 (I_{k,\alpha} - I_{k,\alpha}^0) + \Phi_{k,\beta}^0 (I_{k,\beta} - I_{k,\beta}^0)) - \Delta\Gamma \Phi_{k,\beta}^0}{a \|\vec{\Phi}_m\|^2} \\ v_{\beta,k-1} = \dfrac{\Phi_{k,\beta}^0 (\Phi_{k,\alpha}^0 (I_{k,\alpha} - I_{k,\alpha}^0) + \Phi_{k,\beta}^0 (I_{k,\beta} - I_{k,\beta}^0)) + \Delta\Gamma \Phi_{k,\alpha}^0}{a \|\vec{\Phi}_m\|^2} \end{cases} \quad (24)$$

The above control law can also be expressed in the following manner in the system of axes ($\alpha$, $\beta$):

$$\begin{bmatrix} v_\alpha \\ v_\beta \end{bmatrix}_{k-1} = \frac{1}{\|\vec{\Phi}_m\|^2} \begin{bmatrix} \Phi_\alpha^0 & -\Phi_\beta^0 \\ \Phi_\beta^0 & \Phi_\alpha^0 \end{bmatrix}_k \frac{1}{a} \begin{bmatrix} \Delta W_k \\ \Delta \Gamma_k \end{bmatrix} \quad (25)$$

Consider now the following rotation matrix R:

$$R(\rho_k^0) = \begin{bmatrix} \dfrac{\Phi_\alpha^0}{\|\vec{\Phi}_m\|} & \dfrac{\Phi_\beta^0}{\|\vec{\Phi}_m\|} \\ -\dfrac{\Phi_\beta^0}{\|\vec{\Phi}_m\|} & \dfrac{\Phi_\alpha^0}{\|\vec{\Phi}_m\|} \end{bmatrix}_k = \begin{bmatrix} \cos(\rho^0) & \sin(\rho^0) \\ -\sin(\rho^0) & \cos(\rho^0) \end{bmatrix}_k \quad (26)$$

The control law can then be written as follows:

$$\begin{bmatrix} v_\alpha \\ v_\beta \end{bmatrix}_{k-1} = \frac{1}{\|\vec{\Phi}_m\|} R^{-1}(\rho_k^0) \frac{1}{a} \begin{bmatrix} \Delta W \\ \Delta \Gamma \end{bmatrix}_k \quad (27)$$

Figure 2:
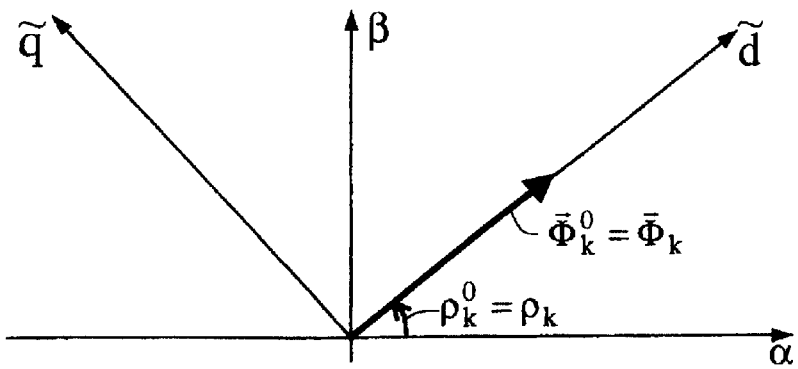
FIG. 2 shows a rotating systems of axes used by the invention to model the operation of the rotating machine.

The regulator 3 therefore has the specific feature of being based on free evolution of the direction of the rotor flux, as shown in FIG. 2. If the reference system of axes is now changed, to a system of axes ($\tilde{d}$, $\tilde{q}$) fixed with respect to the free evolution of the rotor flux, the previous equation is written in the following very simple form:

$$\begin{bmatrix} v_{\tilde{d}} \\ v_{\tilde{q}} \end{bmatrix}_{k-1} = \frac{1}{a\|\vec{\Phi}_k^0\|} \begin{bmatrix} \Delta W \\ \Delta \Gamma \end{bmatrix}_k = \begin{bmatrix} \dfrac{I_{k,\tilde{d}} - I_{k,\tilde{d}}^0}{a} \\ \dfrac{I_{k,\tilde{q}} - I_{k,\tilde{q}}^0}{a} \end{bmatrix} \quad (28)$$

The above equation expresses the voltage that must be applied as input to the inverter 3 at the sampling time k−1 to obtain the required torque variation at the next sampling time k. Note that there is perfect decoupling between torque control and magnetic energy control (angle between the rotor flux and stator current vectors and the modulus of the stator current vector), $V_q$ depending only on the variation of the electromagnetic torque of the machine 1.

Note also that the system of axes ($\tilde{d}$, $\tilde{q}$), which is fixed with respect to the discrete rotor flux, turns stepwise at each sampling time and is equivalent to the system of axes (d, q) of the standard continuous model.

In the final analysis, thanks to the change to discrete time as early as modeling the state of the machine, and by an appropriate choice of the system of axes, there is very surprisingly obtained a very simple model for synchronous motors with smooth poles. In the case of a motor in which the smooth poles of the rotor consist of windings, the amplitude of the magnetic or rotor flux can also be controlled.

Various control strategies can be applied depending on the speed $\Omega$ of the motor.

At a low speed $\Omega$ the torque is a maximum for a given current and zero magnetic energy W. This signifies that the stator current is in quadrature with the rotor or magnetic flux. On the other hand, when the motor is rotating at a speed beyond a particular limit, the available torque is progressively reduced, but the power supplied by the machine is at a maximum. The magnetic energy consumed can then no longer be zero. This speed limitation for a given torque is due in particular to inverter current and voltage limitations.

Figure 3:
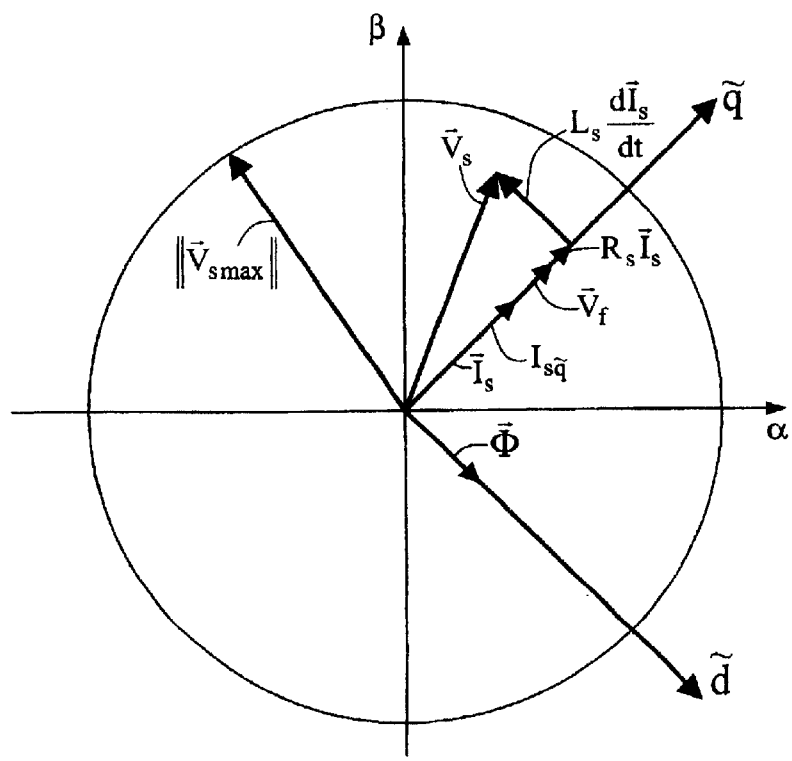
FIG. 3 shows a control strategy conforming to the invention for use when the machine is operating at a low speed.

The strategy to be applied at a low speed is shown in FIG. 3. FIG. 3 shows the various vectors involved in the state equation (1), namely:

$$\frac{d\vec{I}_s}{dt} = -\frac{R_s}{L_s}\vec{I}_s + n_p \frac{\Omega}{L_s}\begin{bmatrix} 0 & 1 \\ -1 & 0 \end{bmatrix}\vec{\Phi} + \frac{1}{L_s}\vec{V}_s \quad (29)$$

whence:

$$\vec{V}_s = L_s \frac{d\vec{I}_s}{dt} + R_s\vec{I}_s + n_p \Omega \underbrace{\begin{bmatrix} 0 & 1 \\ -1 & 0 \end{bmatrix}\vec{\Phi}}_{} \quad (30)$$

$$= L_s \frac{d\vec{I}_s}{dt} + R_s\vec{I}_s + \vec{V}_f$$

Note that the vector $V_f$ is perpendicular to the flux vector $\vec{\Phi}$ and therefore parallel to the current vector $\vec{I}_s$.

For a given speed and a given set point torque, if the modulus of the stator voltage computed by the regulator 3 is less than the voltage $\vec{V}_s$ supplied by the inverter, the control strategy can consist of forcing the component $I_{k,d}$ to zero so that the stator current and the rotor flux are in quadrature. This yields the following control law:

$$\begin{bmatrix} v_{\tilde{d}} \\ v_{\tilde{q}} \end{bmatrix}_{k-1} = \begin{bmatrix} \dfrac{-I_{k,\tilde{d}}^0}{a} \\ \dfrac{\Delta\Gamma_k}{a\|\vec{\Phi}_k^0\|} \end{bmatrix} \quad (31)$$

in which $I_{k,d}{}^0$ is given by the equations (14).

Figure 4:
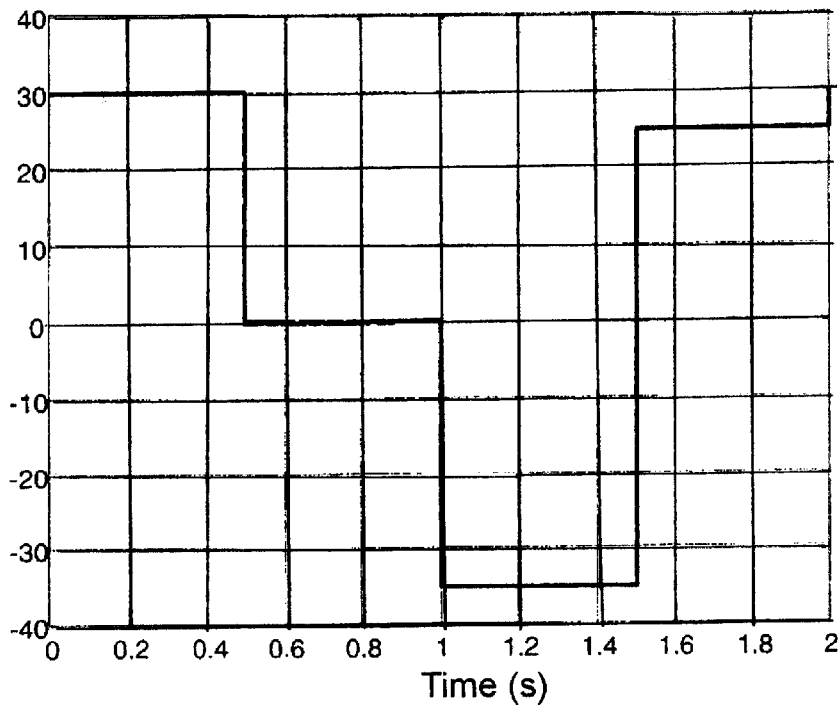
FIG. 4 is a curve of the electromagnetic torque of the machine as a function of time.
Figure 5:
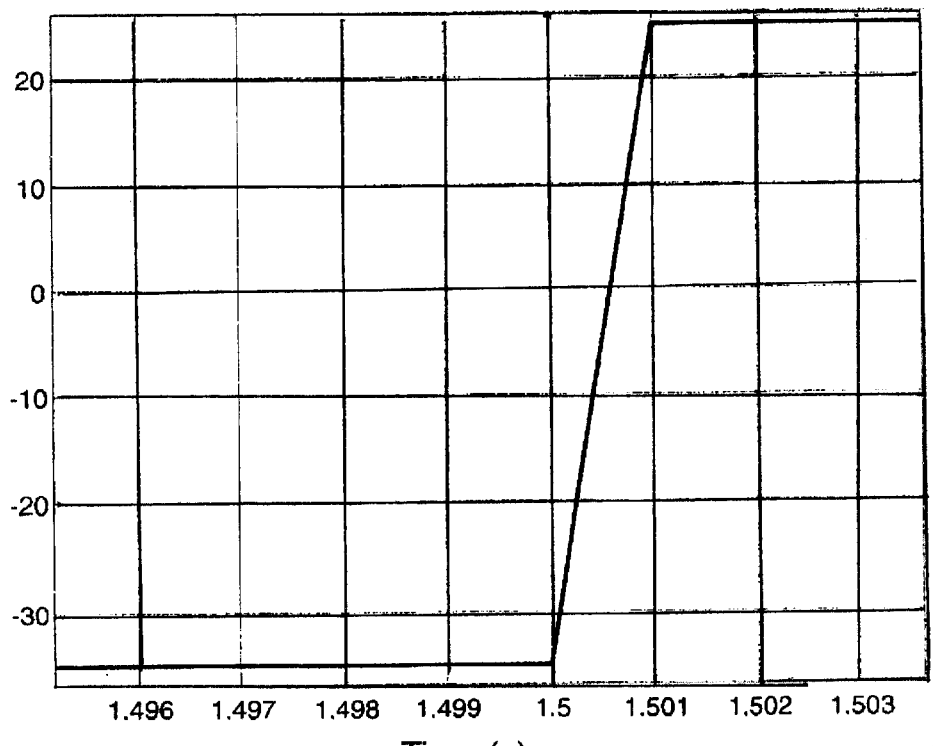
FIG. 5 shows to a larger scale a portion of the curve shown in FIG. 5 when the machine is operating at a low speed.

FIG. 4 shows one example of a curve of the evolution of the torque demanded from the motor as a function of time. The curve shows in particular that at time t=1.5 s the torque has changed from −35 Nm to +25 Nm. Refer now to the curve shown in FIG. 5, which shows in more detail how the torque is changing at about this time, when the motor is rotating at a low speed; it can be seen that the torque has changed from the first value to the second value within a sampling period, i.e. within 1 ms.

At a high speed, for a given set point torque, and if the corresponding control voltage is greater than the voltage $\vec{V}_s$ that the inverter 2 can supply, the preceding strategy cannot be applied. It is therefore necessary to limit the stator voltage by reducing the stator flux, which is given by the following equation:

$$\vec{\Phi}_s = \vec{\Phi}_k + L_s\vec{I}_k \quad (32)$$

Figure 6:
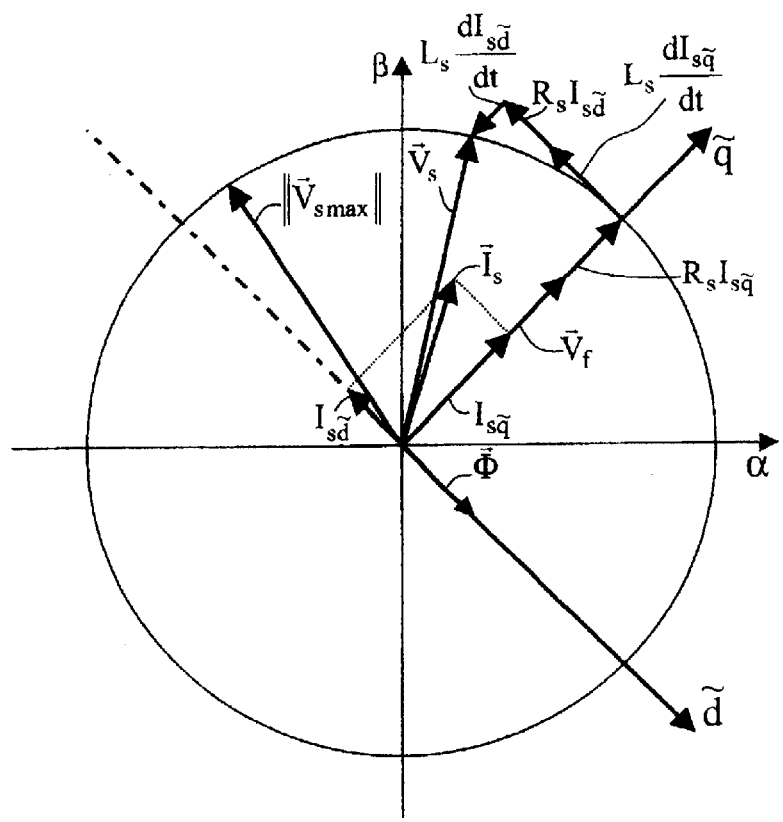
FIGS. 6 and 7 show a control strategy conforming to the invention for use when the machine when operating at a low speed.

Because the rotor flux is constant, the stator flux can be reduced by modifying the modulus of the stator current and the angle between the stator current vector and the magnetic flux, as shown in FIG. 6

The control strategy at high speeds is shown in FIG. 6, in which the stator current and the rotor flux can no longer be in quadrature; in this case the stator flux can in part be compensated by the component $I_{k,d}$ of the stator current.

This strategy assumes that the stator voltage is at a maximum, that is to say:

$$v_{\tilde{d}}^2 + v_{\tilde{q}}^2 = \|\vec{V}_{smax}\|^2 \quad (33)$$

The following equation is obtained from the previous equation and equation (28):

$$(I_{k,\tilde{d}} - I_{k,\tilde{d}}{}^0)^2 + (I_{k,\tilde{q}} - I_{k,\tilde{q}}{}^0)^2 = (a\|\vec{V}_{smax}\|)^2 \quad (34)$$

It is also assumed that the stator current is at a maximum, i.e. that:

$$I_{k,\tilde{d}}{}^2 + I_{k,\tilde{q}}{}^2 = \|I_{smax}\|^2 \quad (35)$$

Figure 7:
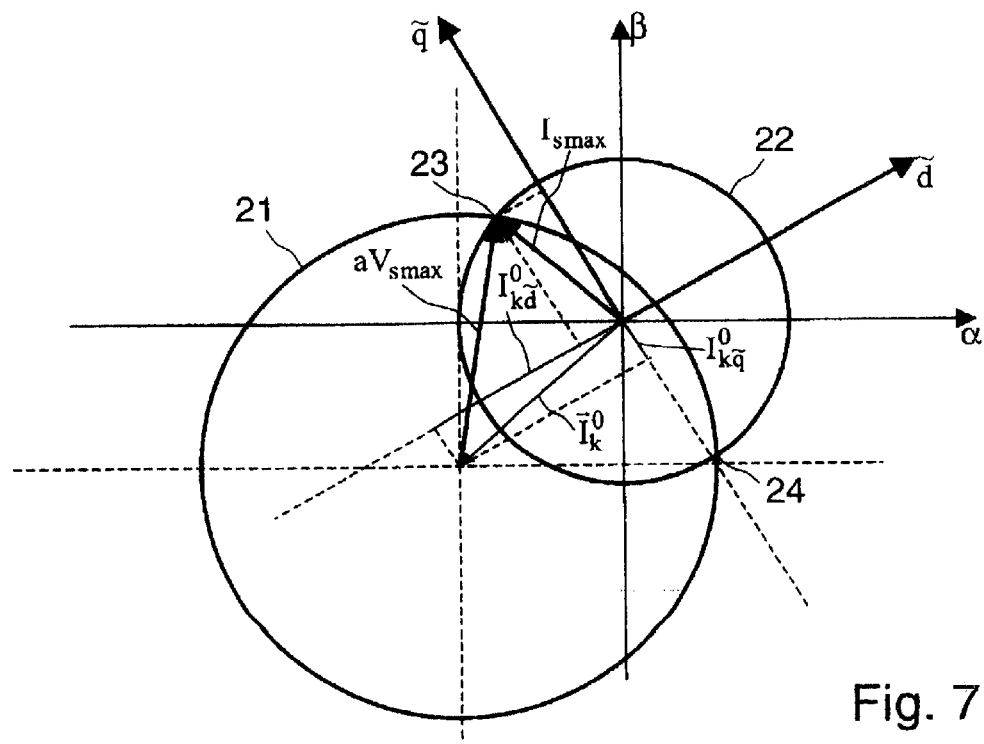

The last two equations are the equations of two circles, the first circle 21 (see FIG. 7) being centered on the end of the vector $\vec{I}_k{}^0$ and having a radius equal to $a\|\vec{V}_{smax}\|$, and the second circle 22 being centered on the origin of the system of axes $(\tilde{d}, \tilde{q})$ having a radius equal to $\|\vec{I}_{smax}\|^2$.

Both equations (34) and (35) are therefore satisfied at the intersection points 23 and 24 of the two circles. In fact, only one of these two points (the point 23) is the optimum for controlling the machine, i.e. the one that corresponds to a stator current component $I_{k,d}$ on the axis $\tilde{d}$ which is negative to reduce the stator flux. The value of that component can be obtained from equation (35):

$$I_{k,\tilde{d}} = -\sqrt{\|\vec{I}_{smax}\|^2 - I_{k,\tilde{q}}{}^2} \quad (36)$$

Furthermore, the area delimited by the intersection of the two circles 21 and 22 corresponds to the possible stator current and voltage values. Consequently, a set point torque can be obtained within a single sampling period if the following condition, resulting from equations (28) and (34), is satisfied:

$$\left(\frac{\Delta\Gamma_k}{\|\vec{\Phi}_m\|}\right)^2 \leq a^2\|\vec{V}_{smax}\|^2 - \left(I_{k,\tilde{d}} - I_{k,\tilde{d}}^0\right)^2 \quad (37)$$

or:

$$I_{k,\tilde{d}}^2 \leq \|\vec{I}_{smax}\|^2 - \left(\frac{\Delta\Gamma}{\|\vec{\Phi}_p^0\|} + I_{k,\tilde{q}}^0\right)^2 \quad (38)$$

This second condition is the result of equations (28) and (35).

Figure 8:
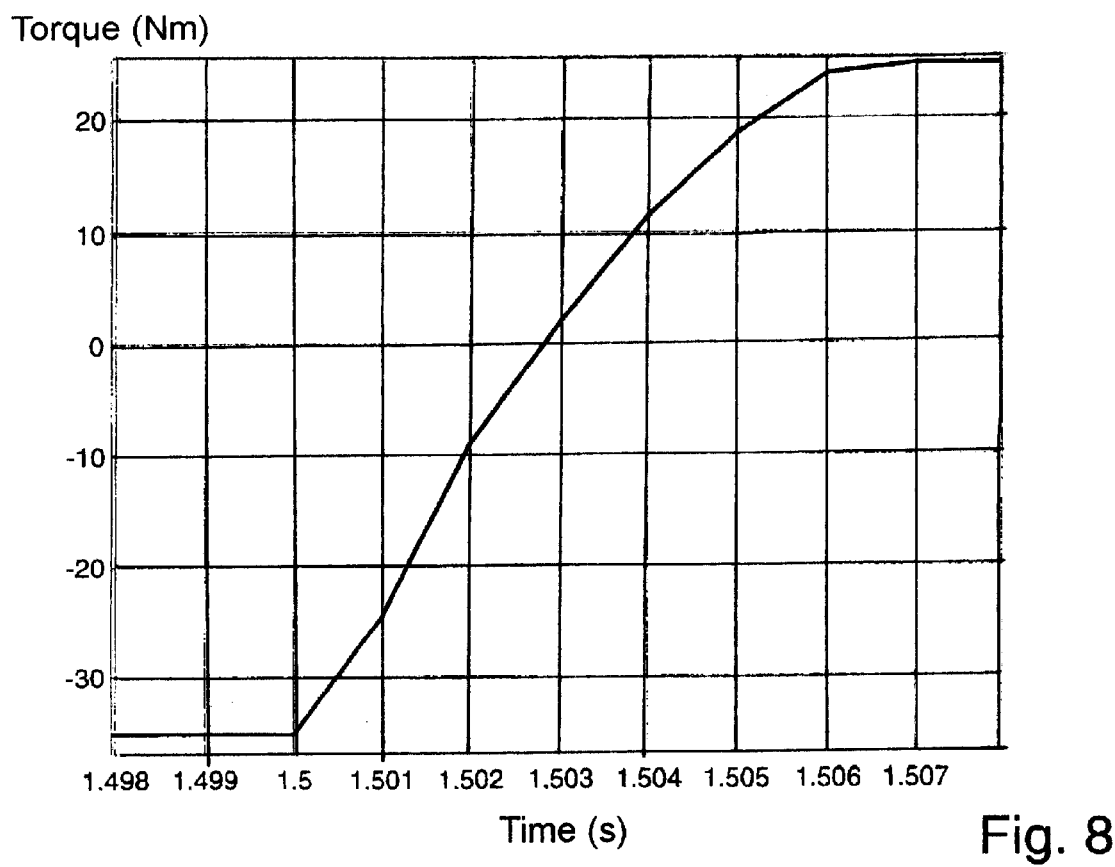
FIG. 8 shows to a larger scale a portion of the curve shown in FIG. 5 when the machine is operating at a high speed.

In FIG. 8, which is to a larger scale, it can be seen that a torque of 25 Nm is achieved within seven sampling periods, i.e. within 7 ms, by applying intermediate set point torques in each sampling period.

Note that the equations that model the operation of the motor 1 and the inverter 2 conforming to the invention are very simple and are not the result of approximations. They can therefore be implemented using relatively modest computation means. What is more, these equations do not necessitate a knowledge of the position of the rotor relative to the stator in each sampling period.

There is claimed:

1. A method of regulating a rotating electrical machine, receiving as input a discrete control voltage determined to control the electromagnetic torque delivered by said machine to a set point torque, by determining at each sampling time said discrete control voltage to be applied to said machine as a function of at least one sampled signal representing the electromagnetic torque of said machine, so that the set point torque is reached at the next sampling time, said method comprising:

determining a discrete voltage control law of said machine in which said discrete control voltage to be applied at each sampling time is determined in the form of a first term corresponding to free evolution of the state of said machine in the absence of control, between the preceding sampling time and the current sampling time, and a second term dependent on said set point torque and a set point for the magnetic energy consumed by said machine, and determining, at each sampling time based on said discrete control law, the control voltage to be applied to said machine for the torque of said machine to reach said set point torque and the magnetic energy consumed by said machine to correspond to said set point magnetic energy, wherein said discrete control law is $\vec{V}_{s,k-1} = \vec{f}(\Delta\Gamma_k, \Delta W_k)$ where f is a function providing said control voltage to be applied at sampling time k−1 to reach said set point torque and energy as a function of variables $\Delta\Gamma_k$ and $\Delta W_k$ respectively representing the difference between said electromagnetic torque of said machine to be reached at said next sampling time and said free evolution component of said torque at said time and the difference between the magnetic energy consumed by said machine at time k and said free evolution component of said energy at said time.

2. The regulation method claimed in claim 1, wherein said set point energy is a minimum energy.

3. The regulation method claimed in claim 1, wherein said discrete control law is determined in a system of axes fixed with respect to said free evolution in discrete time of said rotor flux of said machine.

4. A method of regulating a rotating electrical machine, receiving as input a discrete control voltage determined to control the electromagnetic torque delivered by said machine to a set point torque, by determining at each sampling time said discrete control voltage to be applied to said machine as a function of at least one sampled signal representing the electromagnetic torque of said machine, so that the set point torque is reached at the next sampling time, said method comprising:

determining a discrete voltage control law of said machine in which said discrete control voltage to be applied at each sampling time is determined in the form of a first term corresponding to free evolution of the state of said machine in the absence of control, between the preceding sampling time and the current sampling time, and a second term dependent on said set point torque and a set point for the magnetic energy consumed by said machine, and determining, at each sampling time based on said discrete control law, the control voltage to be applied to said machine for the torque of said machine to reach said set point torque and the magnetic energy consumed by said machine to correspond to said set point magnetic energy, wherein said machine is a synchronous machine with smooth poles and said discrete control law is $$\begin{bmatrix} v_{\vec{d}} \\ v_{\vec{q}} \end{bmatrix}_{k-1} = \frac{1}{a\|\vec{\Phi}_k^0\|} \begin{bmatrix} \Delta W \\ \Delta \Gamma \end{bmatrix}_k$$

where $V_{\vec{d},k-1}$ and $V_{\vec{q},k-1}$ represent the components of the control voltage vector at time k−1, expressed in a system of axes $(\vec{d}, \vec{q})$ that is mobile in discrete time and fixed with respect to said free evolution $\vec{\Phi}_k^0$ of said rotor flux in said machine at said next sampling time k, "a" is a constant, and $\|\vec{\Phi}_k^0\|$ corresponds to the modulus of said free evolution of said rotor flux at said next sampling time k, $\Delta\Gamma_k$ and $\Delta W_k$ respectively representing the difference between said electromagnetic torque of said machine to be reached at said next sampling time k and said component of free evolution of said torque at said time and the difference between said magnetic energy consumed by said machine at said sampling time k and said component of free evolution of said energy at said time.

5. A method of regulating a rotating electrical machine, receiving as input a discrete control voltage determined to control the electromagnetic torque delivered by said machine to a set point torque, by determining at each sampling time said discrete control voltage to be applied to said machine as a function of at least one sampled signal representing the electromagnetic torque of said machine, so that the set point torque is reached at the next sampling time, said method comprising:

determining a discrete voltage control law of said machine in which said discrete control voltage to be applied at each sampling time is determined in the form of a first term corresponding to free evolution of the state of said machine in the absence of control, between the preceding sampling time and the current sampling time, and a second term dependent on said set point torque and a set point for the magnetic energy consumed by said machine, and determining, at each sampling time based on said discrete control law, the control voltage to be applied to said machine for the torque of said machine to reach said set point torque and the magnetic energy consumed by said machine to correspond to said set point magnetic energy, wherein said machine is a synchronous machine with surface-mounted permanent magnets, wherein, when said machine is rotating at a speed less than a predefined threshold, said method includes implementing a low-speed strategy consisting of determining said control voltage to be applied to said machine to reach said set point torque at said next sampling time with zero magnetic energy input, and wherein said low-speed strategy consists of applying the following discrete control law:

$$\begin{bmatrix} v_{\vec{d}} \\ v_{\vec{q}} \end{bmatrix}_{k-1} = \begin{bmatrix} \dfrac{-I_{k,\vec{d}}^0}{a} \\ \dfrac{\Delta\Gamma_k}{a\|\vec{\Phi}_k^0\|} \end{bmatrix}$$

where $I_{k,\vec{d}}^0$ is said component of said free evolution of said stator current along the axis $\vec{d}$ of the system of axes $(\vec{d}, \vec{q})$ fixed with respect to said free evolution of said rotor flux during the sampling period between said sampling times k−1 and k, "a" is a constant, $\|\vec{\Phi}_k^0\|$ corresponds to the modulus of said free evolution of said rotor flux at said next sampling time k, and $\Delta\Gamma_k$ represents the difference between said electromagnetic torque of said machine to be reached at said next sampling time k and said component of free evolution of said torque at said time.

6. A method of regulating a rotating electrical machine, receiving as input a discrete control voltage determined to control the electromagnetic torque delivered by said machine to a set point torque, by determining at each sampling time said discrete control voltage to be applied to said machine as a function of at least one sampled signal representing the electromagnetic torque of said machine, so that the set point torque is reached at the next sampling time, said method comprising:

- determining a discrete voltage control law of said machine in which said discrete control voltage to be applied at each sampling time is determined in the form of a first term corresponding to free evolution of the state of said machine in the absence of control, between the preceding sampling time and the current sampling time, and a second term dependent on said set point torque and a set point for the magnetic energy consumed by said machine, and
- determining, at each sampling time based on said discrete control law, the control voltage to be applied to said machine for the torque of said machine to reach said set point torque and the magnetic energy consumed by said machine to correspond to said set point magnetic energy,
- wherein said machine is a synchronous machine with wound smooth poles,
- wherein, when said machine is rotating at a speed greater than a predefined threshold, said method includes using a high-speed strategy consisting of taking account of limitations of said inverter to determine an intermediate set point torque that said machine can reach at said next sampling time with a given consumption of magnetic energy, and
- wherein said high-speed strategy includes solving the following system of equations:

$$(I_{k,\tilde{d}} - I^0_{k,\tilde{d}})^2 + (I_{k,\tilde{q}} - I^0_{k,\tilde{q}})^2 = (a\|\vec{V}_{smax}\|)^2$$

$$I^2_{k,\tilde{d}} + I^2_{k,\tilde{q}} = \|\vec{I}_{smax}\|^2$$

in which $I_{k,\vec{d}}$ and $I_{k,\vec{q}}$ are the components of said stator current in the system of axes ($\vec{d}$, $\vec{q}$) at said time k, $I_{k,\vec{d}}^0$ and $I_{k,\vec{q}}^0$ are the components of said free evolution of said stator current in said system of axes at the same time, $\|\vec{V}_{smax}\|$ and $\|\vec{I}_{smax}\|$ are respectively the moduli of the maximum voltage and the maximum current in said stator, and "a" is a constant, said control voltage being obtained with the aid of the following equation $$\begin{bmatrix} v_{\tilde{d}} \\ v_{\tilde{q}} \end{bmatrix}_{k-1} = \begin{bmatrix} \dfrac{I_{k,\tilde{d}} - I^0_{k,\tilde{d}}}{a} \\ \dfrac{I_{k,\tilde{q}} - I^0_{k,\tilde{q}}}{a} \end{bmatrix}.$$

7. A power supply circuit for a rotating machine, comprising:

- an inverter; and
- a regulator receiving as input a set point electromagnetic torque and at least one sampled signal representing the electromagnetic torque of said rotating electrical machine and supplying to said inverter a control signal adapted to control said electromagnetic torque of said machine to said set point torque by predicting, at each sampling time, the electromagnetic torque at the next sampling time and consecutively modifying said control voltage, said regulator comprising:
  - a memory for storing a discrete control law for said machine, said control law determining said discrete control voltage to be applied to said machine at a current sampling time in the form of a first term corresponding to free evolution of the state of said machine in the absence of control between the preceding sampling time and said current sampling time and a second term dependent on said set point torque and a set point for the magnetic energy consumed by said machine, and
  - means for determining, at each sampling time, based on said discrete control law, said control voltage to be applied to said machine so that said electromagnetic torque of said machine reaches said set point torque and the magnetic energy consumed by said machine corresponds to said set point energy, wherein said discrete control law is $\vec{V}_{s,k-1} = \vec{f}(\Delta\Gamma_k, \Delta W_k)$, where f is a function providing said control voltage to be applied at sampling time k−1 to reach said set point torque and energy as a function of variables $\Delta\Gamma_k$ and $\Delta W_k$ respectively representing the difference between said electromagnetic torque of said machine to be reached at said next sampling time and said free evolution component of said torque at said time and the difference between the magnetic energy consumed by said machine at time k and said free evolution component of said energy at said time.

8. A power supply circuit for a rotating machine, comprising:

- an inverter; and
- a regulator receiving as input a set point electromagnetic torque and at least one sampled signal representing the electromagnetic torque of said rotating electrical machine and supplying to said inverter a control signal adapted to control said electromagnetic torque of said machine to said set point torque by predicting, at each sampling time, the electromagnetic torque at the next sampling time and consecutively modifying said control voltage, said regulator comprising:
  - a memory for storing a discrete control law for said machine, said control law determining said discrete control voltage to be applied to said machine at a current sampling time in the form of a first term corresponding to free evolution of the state of said machine in the absence of control between the preceding sampling time and said current sampling time and a second term dependent on said set point torque and a set point for the magnetic energy consumed by said machine, and
  - means for determining, at each sampling time, based on said discrete control law, said control voltage to be applied to said machine so that said electromagnetic torque of said machine reaches said set point torque and the magnetic energy consumed by said machine corresponds to said set point energy, wherein said machine is a synchronous machine with smooth poles and said discrete control law is $$\begin{bmatrix} v_{\tilde{d}} \\ v_{\tilde{q}} \end{bmatrix}_{k-1} = \dfrac{1}{a\|\vec{\Phi}_k^0\|} \begin{bmatrix} \Delta W \\ \Delta \Gamma \end{bmatrix}_k$$

where $V_{\vec{d},k-1}$ and $V_{\vec{q},k-1}$ represent the components of the control voltage vector at time k−1, expressed in a system of axes ($\vec{d}$, $\vec{q}$) that is mobile in discrete time and fixed with respect to said free evolution $\vec{\Phi}_k^0$ of said rotor flux in said machine at said next sampling time k, "a" is a constant, and $\|\vec{\Phi}_k^0\|$ corresponds to the modulus of said free evolution of said rotor flux at said next sampling time k, $\Delta\Gamma_k$ and $\Delta W_k$ respectively representing the difference between said electromagnetic torque of said machine to be reached at said next sampling time k and said component of free evolution of said torque at said time and the difference between said magnetic energy consumed by said machine at said sampling time k and said component of free evolution of said energy at said time.

9. A power supply circuit for a rotating machine, comprising:
an inverter; and
a regulator receiving as input a set point electromagnetic torque and at least one sampled signal representing the electromagnetic torque of said rotating electrical machine and supplying to said inverter a control signal adapted to control said electromagnetic torque of said machine to said set point torque by predicting, at each sampling time, the electromagnetic torque at the next sampling time and consecutively modifying said control voltage, said regulator comprising:
a memory for storing a discrete control law for said machine, said control law determining said discrete control voltage to be applied to said machine at a current sampling time in the form of a first term corresponding to free evolution of the state of said machine in the absence of control between the preceding sampling time and said current sampling time and a second term dependent on said set point torque and a set point for the magnetic energy consumed by said machine, and
means for determining, at each sampling time, based on said discrete control law, said control voltage to be applied to said machine so that said electromagnetic torque of said machine reaches said set point torque and the magnetic energy consumed by said machine corresponds to said set point energy,
wherein said machine is a synchronous machine with surface-mounted permanent magnets,
wherein, when said machine is rotating at a speed less than a predefined threshold, said means for determining said control voltage implements a low-speed strategy consisting of determining said control voltage to be applied to said machine to reach said set point torque at said next sampling time with zero magnetic energy input, and
wherein said low-speed strategy consists of applying the following discrete control law:

$$\begin{bmatrix} v_{\vec{d}} \\ v_{\vec{q}} \end{bmatrix}_{k-1} = \begin{bmatrix} \dfrac{-I^0_{k,\vec{d}}}{a} \\ \dfrac{\Delta\Gamma_k}{a\|\vec{\Phi}^0_k\|} \end{bmatrix}$$

where $I^0_{k,\vec{d}}$ is said component of said free evolution of said stator current along the axis $\vec{d}$ of the system of axes ($\vec{d}$, $\vec{q}$) fixed with respect to said free evolution of said rotor flux during the sampling period between said sampling times k−1 and k, "a" is a constant, $\|\vec{\Phi}^0_k\|$ corresponds to the modulus of said free evolution of said rotor flux at said next sampling time k, and $\Delta\Gamma_k$ represents the difference between said electromagnetic torque of said machine to be reached at said next sampling time k and said component of free evolution of said torque at said time.

10. A power supply circuit for a rotating machine, comprising:
an inverter; and
a regulator receiving as input a set point electromagnetic torque and at least one sampled signal representing the electromagnetic torque of said rotating electrical machine and supplying to said inverter a control signal adapted to control said electromagnetic torque of said machine to said set point torque by predicting, at each sampling time, the electromagnetic torque at the next sampling time and consecutively modifying said control voltage, said regulator comprising:
a memory for storing a discrete control law for said machine, said control law determining said discrete control voltage to be applied to said machine at a current sampling time in the form of a first term corresponding to free evolution of the state of said machine in the absence of control between the preceding sampling time and said current sampling time and a second term dependent on said set point torque and a set point for the magnetic energy consumed by said machine, and
means for determining, at each sampling time, based on said discrete control law, said control voltage to be applied to said machine so that said electromagnetic torque of said machine reaches said set point torque and the magnetic energy consumed by said machine corresponds to said set point energy,
wherein said machine is a synchronous machine with wound smooth poles, wherein, when said machine is rotating at a speed greater than a predefined threshold, said means for determining said control voltage implements a high-speed strategy consisting of taking account of limitations of said inverter to determine an intermediate set point torque that said machine can reach at said next sampling time with a given consumption of magnetic energy, and
wherein said high-speed strategy includes solving the following system of equations:

$$(I_{k,\vec{d}} - I^0_{k,\vec{d}})^2 + (I_{k,\vec{q}} - I^0_{k,\vec{q}})^2 = (a\|\vec{V}_{smax}\|)^2$$

$$I^2_{k,\vec{d}} + I^2_{k,\vec{q}} = \|\vec{I}_{smax}\|^2$$

in which $I_{k,\vec{d}}$ and $I_{k,\vec{q}}$ are the components of said stator current in the system of axes ($\vec{d}$, $\vec{q}$) at said time k, $I^0_{k,\vec{d}}$ and $I^0_{k,\vec{q}}$ are the components of said free evolution of said stator current in said system of axes at the same time, $\|\vec{V}_{smax}\|$ and $\|\vec{I}_{smax}\|$ are respectively the moduli of the maximum voltage and the maximum current in said stator, and "a" is a constant, said control voltage is determined based on the following equation $$\begin{bmatrix} v_{\vec{d}} \\ v_{\vec{q}} \end{bmatrix}_{k-1} = \begin{bmatrix} \dfrac{I_{k,\vec{d}} - I^0_{k,\vec{d}}}{a} \\ \dfrac{I_{k,\vec{q}} - I^0_{k,\vec{q}}}{a} \end{bmatrix}.$$

* * * * *